US009804693B2

(12) United States Patent
Long

(10) Patent No.: US 9,804,693 B2
(45) Date of Patent: Oct. 31, 2017

(54) HANDHELD CONTROLLER WITH ACTIVATION SENSORS

(71) Applicant: Oculus VR, LLC, Menlo Park, CA (US)

(72) Inventor: Clare Regimbal Long, Edmonds, WA (US)

(73) Assignee: Oculus VR, LLC, Menlo Park, CA (US)

( * ) Notice: Subject to any disclaimer, the term of this patent is extended or adjusted under 35 U.S.C. 154(b) by 12 days.

(21) Appl. No.: 14/975,049

(22) Filed: Dec. 18, 2015

(65) Prior Publication Data

US 2017/0177102 A1 Jun. 22, 2017

(51) Int. Cl.
G06F 3/041 (2006.01)
G06F 3/0354 (2013.01)
G06F 3/044 (2006.01)
G06F 3/0338 (2013.01)

(52) U.S. Cl.
CPC ........ *G06F 3/03547* (2013.01); *G06F 3/0338* (2013.01); *G06F 3/044* (2013.01)

(58) Field of Classification Search
CPC . G06F 3/011; G06F 3/02; G06F 3/033; G06F 3/0338; G06F 3/0346; G06F 3/03541; G06F 3/03547; G06F 3/048; G06F 3/04842; G06F 2203/0334; G06F 2203/0335; G06F 2203/0382; A63F 9/24; A63F 2009/2407; A63F 13/24
See application file for complete search history.

(56) References Cited

U.S. PATENT DOCUMENTS

| 4,552,360 | A | * | 11/1985 | Bromley | ................. A63F 13/06 345/159 |
| 5,181,009 | A | | 1/1993 | Perona | |
| D341,094 | S | | 11/1993 | Austin | |
| 5,265,009 | A | | 11/1993 | Colavita et al. | |
| D350,351 | S | | 9/1994 | Nakamura | |
| D369,754 | S | | 5/1996 | Donaldson | |
| 5,796,354 | A | | 8/1998 | Cartabiano et al. | |
| 5,982,355 | A | * | 11/1999 | Jaeger | ................. G02F 1/13306 345/161 |
| D418,174 | S | | 12/1999 | Jankowski et al. | |
| D418,879 | S | | 1/2000 | Hornsby et al. | |
| 6,173,203 | B1 | | 1/2001 | Barkley et al. | |
| 6,192,253 | B1 | | 2/2001 | Charlier et al. | |

(Continued)

OTHER PUBLICATIONS

U.S. Appl. No. 14/934,073 by Long, C., et al., filed Nov. 5, 2015.

(Continued)

*Primary Examiner* — Joe H Cheng
(74) *Attorney, Agent, or Firm* — Perkins Coie LLP

(57) ABSTRACT

A handheld controller, comprising a main body, handle extending from the main body, first and second input controls positioned for engagement by a user's fingers, and a finger detection sensor coupled to the first input control. One or more finger detection sensors are configured to detect the spatial location of the user's finger relative to a surface of the first input control. The finger detection sensor can be a touch capacitive sensor. The handheld controller can have one or more proximity sensors configured to detect the spatial location of the user's finger relative to the first input control.

20 Claims, 4 Drawing Sheets

(56) References Cited

U.S. PATENT DOCUMENTS

| | | | |
|---|---|---|---|
| 6,430,110 B2 | 8/2002 | Baroche et al. | |
| D472,972 S | 4/2003 | Anderson | |
| 6,590,835 B2 | 7/2003 | Farine et al. | |
| 6,970,157 B2 | 11/2005 | Siddeeq et al. | |
| 7,004,469 B2 | 2/2006 | von Goeben et al. | |
| 7,106,197 B2 | 9/2006 | Gaiotto et al. | |
| 7,345,670 B2 * | 3/2008 | Armstrong | G06F 3/0213 345/156 |
| D586,823 S | 2/2009 | Anderson et al. | |
| D616,417 S | 5/2010 | Liao et al. | |
| 8,064,972 B2 | 11/2011 | Russo et al. | |
| 8,188,842 B2 | 5/2012 | Otsuka et al. | |
| 8,795,078 B1 * | 8/2014 | Musick, Jr. | G06F 3/0346 463/37 |
| 8,994,643 B2 | 3/2015 | Goodwin et al. | |
| D729,803 S * | 5/2015 | Avery | D14/401 |
| 9,141,087 B2 | 9/2015 | Brown et al. | |
| 9,386,662 B1 * | 7/2016 | Hoddie | H05B 37/0272 |
| 9,421,472 B2 | 8/2016 | Buller et al. | |
| D772,986 S * | 11/2016 | Chen | D14/203.3 |
| D780,807 S * | 3/2017 | Chen | D14/203.3 |
| 2001/0015718 A1 * | 8/2001 | Hinckley | A63F 13/06 345/156 |
| 2004/0222963 A1 * | 11/2004 | Guo | G06F 3/0202 345/156 |
| 2005/0255915 A1 * | 11/2005 | Riggs | A63F 13/06 463/37 |
| 2007/0049374 A1 * | 3/2007 | Ikeda | A63F 13/06 463/30 |
| 2007/0066394 A1 * | 3/2007 | Ikeda | A63F 13/06 463/37 |
| 2008/0261693 A1 * | 10/2008 | Zalewski | G06F 3/0304 463/31 |
| 2008/0261695 A1 * | 10/2008 | Coe | A63F 13/22 463/37 |
| 2009/0143110 A1 * | 6/2009 | Armstrong | G06F 3/0338 455/566 |
| 2009/0290345 A1 | 11/2009 | Shaner et al. | |
| 2009/0295721 A1 * | 12/2009 | Yamamoto | G06F 3/0346 345/158 |
| 2009/0298590 A1 * | 12/2009 | Marks | A63F 13/02 463/37 |
| 2010/0009760 A1 * | 1/2010 | Shimamura | A63F 13/211 463/43 |
| 2010/0085321 A1 * | 4/2010 | Pundsack | G06F 3/044 345/173 |
| 2010/0144436 A1 * | 6/2010 | Marks | G06F 3/017 463/36 |
| 2013/0324254 A1 * | 12/2013 | Huang | G06F 3/016 463/37 |
| 2014/0361977 A1 | 12/2014 | Mao et al. | |
| 2014/0364212 A1 * | 12/2014 | Osman | A63F 13/213 463/31 |
| 2015/0077398 A1 | 3/2015 | Yairi et al. | |
| 2015/0094142 A1 * | 4/2015 | Stafford | A63F 13/212 463/31 |
| 2015/0155445 A1 | 6/2015 | Crowder et al. | |
| 2015/0258431 A1 | 9/2015 | Strafford et al. | |
| 2015/0268920 A1 | 9/2015 | Schapiro | |
| 2015/0370320 A1 | 12/2015 | Connor et al. | |
| 2016/0357249 A1 * | 12/2016 | Webb | G06F 3/011 |
| 2016/0357261 A1 * | 12/2016 | Bristol | A63F 13/24 |
| 2016/0361637 A1 * | 12/2016 | Higgins | A63F 13/24 |
| 2016/0361638 A1 * | 12/2016 | Higgins | A63F 13/24 |
| 2016/0363996 A1 * | 12/2016 | Higgins | G06F 3/014 |
| 2016/0364910 A1 * | 12/2016 | Higgins | G06T 19/006 |
| 2017/0128828 A1 | 5/2017 | Long | |
| 2017/0131767 A1 | 5/2017 | Long | |
| 2017/0136351 A1 | 5/2017 | Long | |
| 2017/0139481 A1 | 5/2017 | Long et al. | |
| 2017/0168303 A1 | 6/2017 | Petrov et al. | |
| 2017/0189798 A1 | 7/2017 | Rogoza et al. | |
| 2017/0189799 A1 | 7/2017 | Anderson et al. | |
| 2017/0189802 A1 | 7/2017 | Rogoza et al. | |
| 2017/0192495 A1 | 7/2017 | Drinkwater et al. | |
| 2017/0192506 A1 | 7/2017 | Andersen et al. | |

OTHER PUBLICATIONS

U.S. Appl. No. 14/934,090 by Long, C., et al., filed Nov. 5, 2015.
U.S. Appl. No. 14/939,431 by Long, C., et al., filed Nov. 12, 2015.
U.S. Appl. No. 14/939,470 by Long, C., et al., filed Nov. 12, 2015.
Supplemental Notice of Allowability dated Jul. 10, 2017 of U.S. Appl. No. 29/571,030 by Chen, Y., et al., filed Jul. 13, 2016.
Supplemental Notice of Allowability dated Jul. 6, 2017 for U.S. Appl. No. 29/571,025 by Chen, Y., et al., filed Jul. 13, 2016.
Non-Final Office Action dated Jul. 17, 2017 for U.S. Appl. No. 14/939,431 by Long, C., et al., filed Nov. 12, 2015.
Canadian Examiner's Report in Patent Application No. 163,150, dated Dec. 15, 2015, 5 pages.
Canadian Examiner's Report in Patent Application No. 163,150, dated Apr. 8, 2016, 7 pages.
Canadian Examiner's Report in Patent Application No. 167,457, dated Apr. 8, 2016, 1 page.
Canadian Examiner's Report in Patent Application No. 167,458, dated Apr. 8, 2016, 1 page.
Canadian Examiner's Report in Patent Application No. 167,456, dated Apr. 8, 2016, 1 page.
First Examination Report in Indian Patent Application No. 278272, dated Mar. 18, 2016, 2 pages.
First Examination Report in Indian Patent Application No. 278275, dated Mar. 28, 2016, 2 pages.
First Examination Report in Indian Patent Application No. 278274, dated Mar. 14, 2016, 2 pages.
First Examination Report in Indian Patent Application No. 278273, dated Mar. 18, 2016, 2 pages.
Office Action in Korean Patent Application No. 30-2015-0063452, dated Aug. 9, 2016, 3 pages.
Office Action in Mexican Design Patent Application No. MX/f/2015/003769, dated Feb. 7, 2017, 4 pages.
U.S. Appl. No. 29/529,915 by Chen, Y., et al., filed Jun. 11, 2015.
U.S. Appl. No. 29/571,025 by Chen, Y., et al., filed Jul. 13, 2016.
U.S. Appl. No. 29/571,027 by Chen, Y., et al., filed Jul. 13, 2016.
U.S. Appl. No. 29/571,030 by Chen, Y., et al., filed Jul. 13, 2016.
U.S. Appl. No. 14/991,875 by Drinkwater, J., et al., filed Jan. 8, 2016.
U.S. Appl. No. 15/172,099 by Rogoza, B., et al., filed Jun. 2, 2016.
U.S. Appl. No. 15/173,474 by Rogoza, B., et al., filed Jun. 3, 2016.
U.S. Appl. No. 15/173,558 by Andersen, B., et al., filed Jun. 3, 2016.
U.S. Appl. No. 15/177,121 by Anderson, B., et al., filed Jun. 2, 2016.
U.S. Appl. No. 29/579,091 by Chen, Y., et al., filed Sep. 27, 2016.
Notice of Allowance dated Jun. 29, 2016, for U.S. Appl. No. 29/529,915 by Chen, Y., et al., filed Jun. 11, 2015.
Restriction Requirement dated Apr. 8, 2016, for U.S. Appl. No. 29/529,915 by Chen, Y., et al., filed Jun. 11, 2015.
Notice of Allowance dated Sep. 27, 2016, for U.S. Appl. No. 29/529,915 by Chen, Y., et al., filed Jun. 11, 2015.
Non-Final Office Action dated Mar. 23, 2017 for U.S. Appl. No. 14/934,073 by Long, C., et al., filed Nov. 5, 2015.
Non-Final Office Action dated Mar. 30, 2017 for U.S. Appl. No. 14/939,470 by Long, C., et al., filed Nov. 12, 2015.
Ex Parte Quayle Action mailed May 5, 2017 for U.S. Appl. No. 29/571,027 by Chen, Y., et al., filed Jul. 13, 2016.
Ex Parte Quayle Action mailed May 5, 2017 for U.S. Appl. No. 29/571,030 by Chen, Y., et al., filed Jul. 13, 2016.
Ex Parte Quayle Action mailed May 8, 2017 for U.S. Appl. No. 29/571,025 by Chen, Y., et al., filed Jul. 13, 2016.
Notice of Allowance dated Jun. 15, 2017 of U.S. Appl. No. 29/571,030 by Chen, Y., et al., filed Jul. 13, 2016.
Notice of Allowance dated Jun. 21, 2017 for U.S. Appl. No. 29/571,025 by Chen, Y., et al., filed Jul. 13, 2016.
Notice of Allowance dated Jun. 22, 2017 for U.S. Appl. No. 29/571,027 by Chen, Y., et al., filed Jul. 13, 2016.

(56) References Cited

OTHER PUBLICATIONS

Office Action in Brazil Design Patent Application No. 30-2015-005620-7, dated May 30, 2017,30 pages.

* cited by examiner

HANDHELD CONTROLLER WITH ACTIVATION SENSORS

TECHNICAL FIELD

This patent application is directed to handheld controllers and, more specifically, to virtual reality handheld controllers.

BACKGROUND

In a virtual reality system, a user wears a head-mounted display that presents a selected virtual reality (VR) environment in front of the user's eyes. In some VR systems, a user can manipulate items in the virtual environment with handheld controllers. The controllers include tracking patterns comprised of a pattern of lights, for example. The system monitors the movement of the tracking patterns with a tracking camera and reproduces the user's hand movements in the virtual environment. However, input controls, such as buttons or thumbsticks traditionally used on game controllers are activated by pressing on or pivoting the input control relative to the controller's housing. Input controls do not typically detect the contact or the spatial presence of a user's fingers or thumb relative to control members.

BRIEF DESCRIPTION OF THE DRAWINGS

Embodiments of the handheld controller with activation sensors introduced herein may be better understood by referring to the following Detailed Description in conjunction with the accompanying drawings, in which like reference numerals indicate identical or functionally similar elements.

Figure 1:
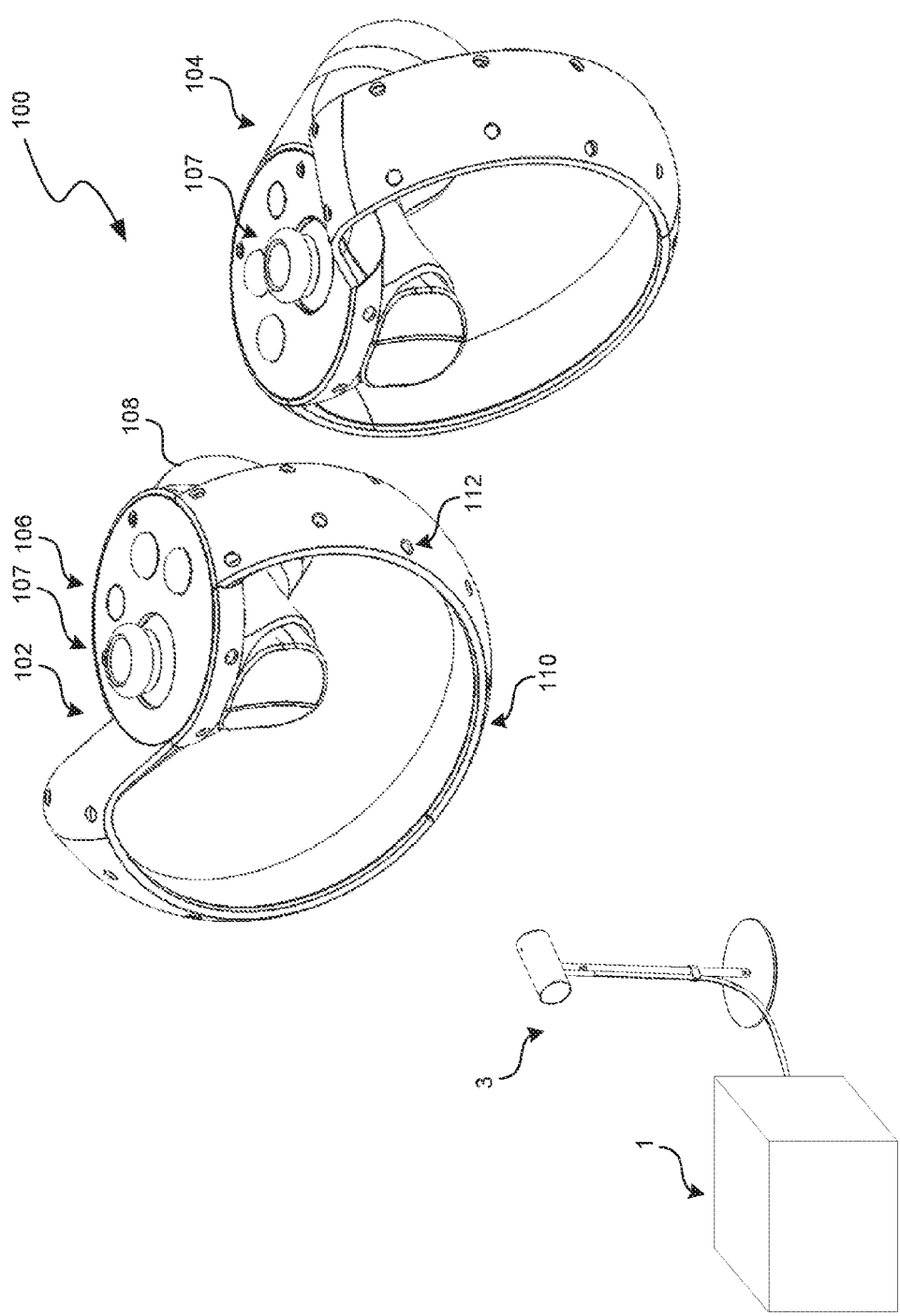
FIG. 1 is an isometric view of a pair of handheld controllers with activation sensors each operative to detect a user's hand contact or spatial presence according to a representative embodiment.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments as defined by the appended claims.

DETAILED DESCRIPTION

Overview

A handheld controller with input controls having touch and/or position sensors is disclosed. In an embodiment, handheld controller includes a main body, a handle extending from the main body, one or more input controls positioned for engagement by a user's fingers. A finger detection sensor is coupled to the first input control to detect the spatial location of the user's finger relative to a surface of the first input control. The finger detection sensor can be a touch capacitive sensor. The handheld controller can have one or more proximity sensors configured to detect the spatial location of the user's finger relative to the first input control.

An embodiment of the present disclosure provides a handheld controller comprising a main body, a handle extending from the main body, and a first input control on the main body positioned for engagement by a first one of the user's fingers. A second input control is spaced apart from the first input control and is positioned for engagement by a second one of the user's fingers. A finger detection sensor is coupled to the first input control and configured to detect the spatial location of the user's finger relative to a surface of the first input control.

Another embodiment of the present technology provides a handheld controller comprising a first input control on a main body of the controller and positioned for engagement by a user's thumb. A plurality of proximity sensors are coupled to the main body and configured to detect a spatial location of the user's thumb relative to the first input control. A processor is coupled to the plurality of proximity sensors and configured to determine the special location of the user's thumb fingers relative to the to the first input control.

Another embodiment provides a handheld controller comprising a main body, a handle extending from the main body, and a first input control on the main body and having a finger engagement surface positioned for engagement by a first one of a user's fingers. A plurality of detection sensors are coupled to the main body and configured to detect a spatial location of the first one of a user's fingers relative to the first input control. At least one of the detection sensors is a capacitive sensor coupled to the finger engagement surface. A processor is coupled to the plurality of detection sensors and configured to determine the special location of the first one of a user's fingers relative to the to the first input control.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a pair of handheld controllers 100 according to a representative embodiment. The pair of handheld controllers 100 includes a right-hand controller 102 and a left-hand controller 104. The primary structure of the right-hand controller 102 and the left-hand controller 104 when held adjacent to each other in a similar orientation, as illustrated, are substantially symmetric with respect to each other. Both controllers 102/104 are described herein with respect to the right-hand controller 102, as both controllers include the same or similar features, albeit in mirror image. The right-hand controller 102 includes a main body 106 and a handle 108 extending from the main body 106, and input controls 107 connected to the handle 108 and main body 106. In some embodiments, a surrounding ring portion 110 extends from the main body 106. The controllers 102/104 can be part of a VR system 1, such as the Rift™ available from Oculus™. Each of the controllers 102/104 includes a plurality of tracking features positioned in a corresponding tracking pattern, such as the right-hand controller's tracking pattern 112. The tracking features in the tracking patterns are configured to be accurately tracked by a tracking camera 3 to determine the motion, orientation, and/or spatial position of the controller for reproduction in a virtual environment. The tracking features can include, for example, fiducial markers or light emitting diodes (LED).

Figure 3:
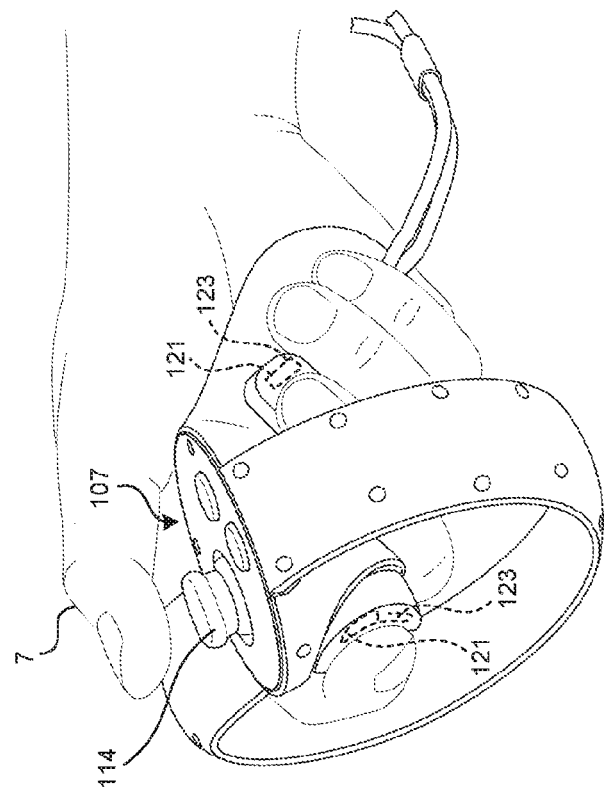
FIG. 3 is an isometric view of the right-hand controller as shown in FIG. 2 with the user's thumb positioned above a thumbstick having an activation sensor.
Figure 2:
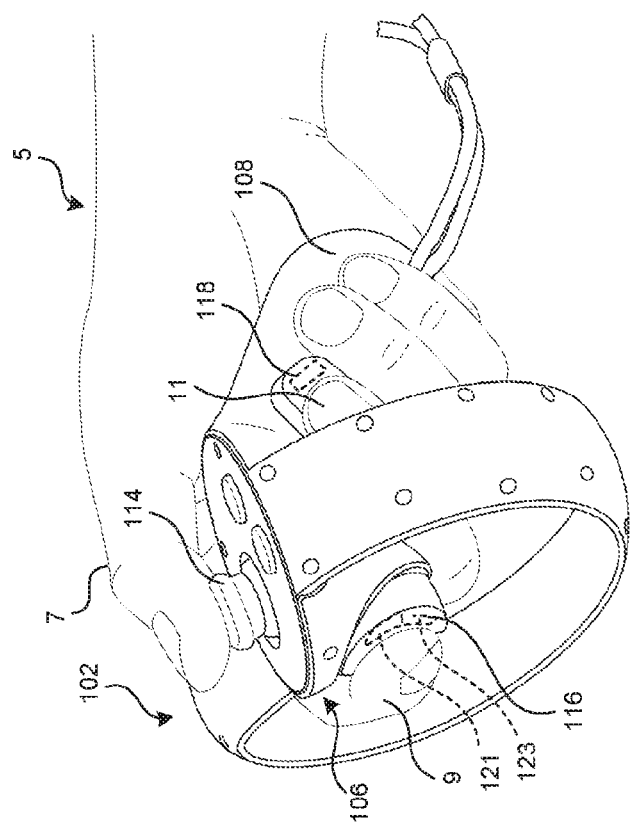
FIG. 2 is an isometric view of a user's right hand grasping the right-hand controller of FIG. 1.

As shown in FIGS. 2 and 3, the handle portion 108 of the right-hand controller 102 is grasped by a user's right hand 5 with the user's thumb and fingers adjacent to the control inputs 107. When the controller 102 is grasped, the user's thumb 7 (i.e., the user's first finger) is positioned above the main body 106 and rests on a thumbstick 114. The user's second or index finger 9 is positioned on a trigger button 116. The user's third or middle finger 11 is positioned to contact a third finger button 118 on the handle portion 108. The controllers 102 and 104 are configured to detect the presence or spatial position of a user's fingers relative to the controller 102/104, such as whether the user's thumb or finger is actually touching an input control 102/104, immediately adjacent to the input control (FIG. 2), or spaced further away from the input control (FIG. 3). As described more fully below, each handheld controller 102/104 is configured to sense and detect when the user positions his or her thumb 7 on or adjacent to the thumbstick 114, including how close the thumb (or other finger) is to the surface of the thumbstick. The movement of a user's thumb or fingers on or adjacent to the input controls 107 can be used to generate control signal, or could be used to indicate a hand gesture, such as a thumbs-up gesture or a pointing gesture. For example, a thumbs up gesture can be detected with sensors on or associated the thumbstick 114 or the controller's thumb surface. A pointing gesture can be detected with sensors associated with the trigger button 116. A hand or finger gesture, such as an open hand, can be detected with the sensors associated with the third finger button 118. The contact or spatial presence of a user's thumb or other fingers relative to the controller 102/104 can be a signal to the VR system to initiate a command or to include a gesture or other hand position in a corresponding apparition or avatar.

Figure 4:
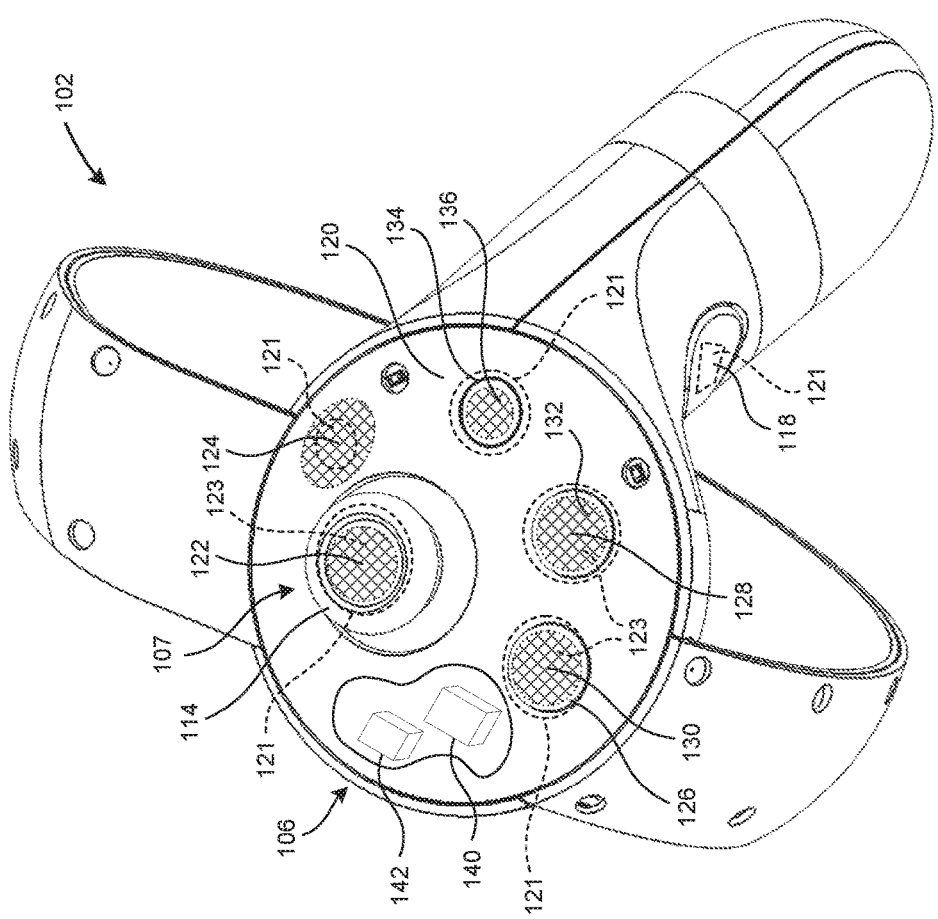
FIG. 4 is an isometric view of the right-hand controller shown in FIGS. 1-3 as viewed from the top of the controller.

With further reference to FIG. 4, the main body 106 of the right-hand controller 102 includes a thumb surface 120 from which the thumbstick 114 extends. The thumbstick 114 can include a thumb sensor 122 to detect the presence of the user's thumb or other finger. The presence of a finger can include touching the sensor or hovering over or adjacent to the sensor 122. In some embodiments, the thumb sensor 122 can be a capacitive touch sensor or a proximity sensor. The thumb surface 120 or the thumbstick 114 can include one or more proximity sensors 121 alone or in conjunction with a capacitive touch sensor to detect the spatial location of the user's thumb relative to the thumbstick 114. The thumb surface 120 can include a sensor area 124 with a capacitive touch sensor 123 and/or a proximity sensor 121 in a selected position positioned, such as next to the thumbstick 114, in order to detect when a user is resting his or her thumb on or adjacent to the thumb surface 120. In some embodiments, the entire thumb surface 120 is a capacitive touch sensor 123 or a proximity and 121. The proximity sensors 121 can be used to determine the location of the user's relative to the thumb surface, the thumb stick 114, or other control inputs on the thumb surface 120. The thumb surface 120 may include additional buttons 126, 130, and 134, each of which may include a position sensor 128, 132, and 136, respectively, such as a capacitive touch sensor 123 or a proximity sensor 121. In at least one embodiment, the sensors on the thumbstick 114, the thumb surface 120, or other areas of the controller 102, such as on the handle or other buttons or control inputs, can be used to detect a hand gesture, such as a thumbs-up gesture, as is described in U.S. patent application Ser. No. 14/939,470, titled "METHOD AND APPARATUS FOR DETECTING HAND GESTURES WITH A HANDHELD CONTROLLER, filed Nov. 12, 2015, which is incorporated herein in its entirety by reference. In some embodiments, the trigger button 116 (see FIG. 2) and the third finger button 118 can each include a capacitive touch sensor and/or a proximity sensor to facilitate finger detection, including gesture detection, according to the disclosed techniques. The third finger button 118 is described further in U.S. patent application Ser. No. 14/939,431, titled "HANDHELD CONTROLLER WITH THIRD FINGER GRIP DETECTION," filed Nov. 12, 2015, which is incorporated herein in its entirety by reference.

In some embodiments, the controller 102 includes an inertial measurement unit (IMU) 142 to monitor rotation and orientation of the controller. Thus, if the user makes a thumbs-up gesture and the IMU 142 determines that the user's hand has been rotated, then the registered hand gesture can be modified to represent a thumbs-down gesture, for example. The IMU 142 can also receive signals from the proximity sensors 121 to detect and determine the spatial location of the user's fingers relative to the controller 102 before or after the user has grasped or activated a control input on the controller. The finger movement can be utilized for generating control signals or operating commands to the VR system 1. In some embodiments, the controller 102 includes a processor or microcontroller 140 to perform the timing and monitoring of the buttons (114, 116, 118, 126, 130, 134), sensors (122, 124, 128, 132, 136), and IMU 142. In other embodiments, a computer included in the VR system 1 (see FIG. 1) can be used to monitor the buttons, sensors, and IMU 142 and to determine the hand gesture indicated by the sensors and buttons. In some embodiments, the rotation and orientation of the handheld controller is determined by the IMU 142 and/or by monitoring the tracking pattern 112 with the tracking camera 3 (see FIG. 1).

Figure 5:
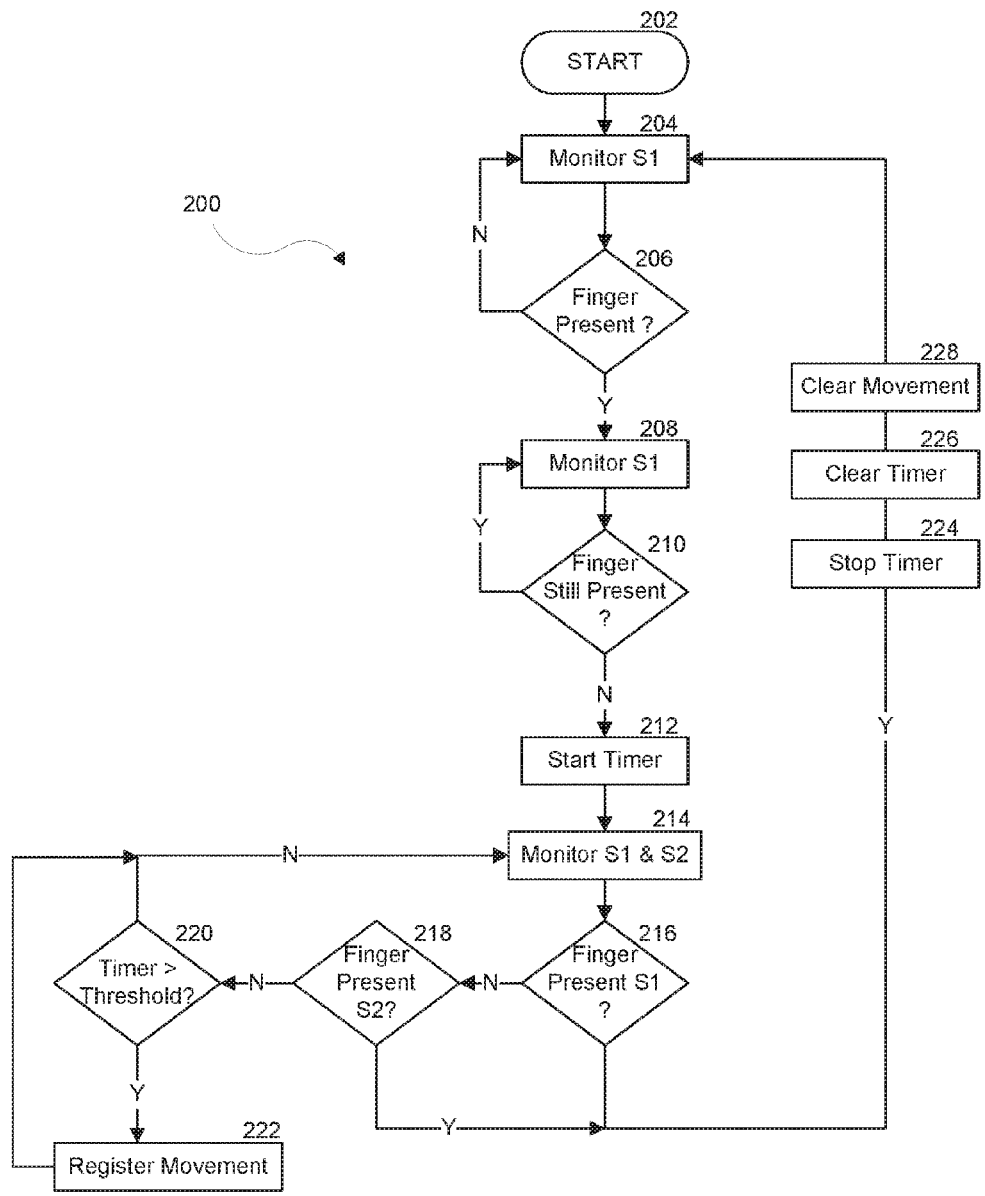
FIG. 5 is a flowchart illustrating a representative method for detecting a user's hand gestures.

FIG. 5 illustrates a representative method for determining a finger movement with a handheld controller as described above. The method 200 starts at 202 where a first sensor S1, such as the thumb sensor 122, is monitored at step 204. At step 206, a determination is made as to whether a finger, such as a thumb, is present on the first sensor S1. If there is still no finger present on or adjacent to the first sensor S1 at step 206, then the first sensor S1 continues to be monitored and returns back to step 204. If a finger is present on the first sensor S1, the method moves to step 208.

If a finger is detected at step 206, the method moves to step 208 where again the first sensor S1 is monitored to determine if the finger remains present, is removed from the sensor, or is spatially moved relative to the sensor (i.e., closer to or further from the sensor). Thus, a determination is made at step 210 if the finger is still present on or adjacent to the sensor. If the finger is still present on or adjacent to the sensor, then at step 208 the sensor continues to be monitored. However, if there is no longer a finger present on or adjacent to the sensor (i.e., the user has removed or otherwise moved his or her thumb or other finger a selected distance away from the sensor), a timer is started at step 212.

Once the timer is started at step 212, the first sensor S1 and one or more second sensors S2, such as any of the buttons (114, 116, 118, 126, 130, 134) or sensors (122, 124, 128, 132, 136), are monitored at step 214 to determine if the user puts their thumb or finger down onto a sensor, or moves the thumb or finger into the proximity of the sensor. Thus, at step 216, a determination is made as to whether the finger is present on or adjacent to the first sensor S1. If there is not a finger present on or sufficiently adjacent to the first sensor S1, then a determination is made at step 218 as to whether the finger is present at or adjacent to a second sensor S2. If there is no finger present on or adjacent to sensor S2, then a check is made at step 220 to determine if the timer has exceeded a threshold time value. If the timer has exceeded the threshold time value, a gesture or finger movement is registered for use by the VR system 1. In other words, if the thumb or finger is moved relative to a first sensor S1 by a selected distance or for a selected period of time (e.g., two seconds), it is determined that the user is making a gesture or other control-related movement.

Once the movement is registered at step 222, sensors S1 and S2 continue to be monitored at step 214. Also, if the timer has not reached the threshold time value, the method returns to step 214 to continue monitoring sensors S1 and S2. If the finger is detected at either sensor S1 or sensor S2, the method resets and returns to step 204 to begin monitoring the first sensor S1 again. When the method resets, the timer is stopped at step 224, the timer is cleared at step 226, and the finger movement is cleared at step 228.

In some embodiments, the registered finger movement at step 222 can be modified based on the orientation of the controller such as measured by the IMU 142 or via the tracking patterns 112. For example, if the controller is rotated approximately 90 degrees from vertical, the finger movement can be identified to indicate a change from a first gesture, such as a thumbs-up gesture, and to a second gesture or movement related to one or more commands, such as indicate a sideways movement command. In another example, if the controller is rotated 180 degrees from vertical, the finger movement or gesture can be modified to indicate a different command or gesture, such as a thumbs-down gesture or a downward movement command. In some embodiments, a resting position is registered if the thumb is sensed on or adjacent to the second sensor S2 prior to the time period exceeding the threshold time value. In some embodiments, the trigger button 116 and third button 118 can be used to determine other hand or finger movement commands or gestures based upon the detection of the finger movement relative to the sensors on the controller.

Remarks

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A handheld controller for use with a virtual reality system, comprising:
    a body portion;
    a handle extending from the body portion and configured to be grasped by a user;
    a first input control on the body portion positioned for engagement by a first one of the user's fingers;
    a second input control spaced apart from the first input control and positioned for engagement by a second one of the user's fingers; and
    a finger detection sensor coupled to the first input control, wherein the finger detection sensor is configured to detect the spatial location and movement of the user's finger relative to a surface of the first input control, wherein the detected spatial location and movement are associated with a hand position or gesture in a corresponding apparition or avatar displayed in the virtual reality system.

2. The handheld controller of claim 1 wherein the body portion includes a thumb surface and further comprising a thumbstick extending from the thumb surface, wherein the finger detection sensor is disposed on the thumbstick.

3. The handheld controller of claim 2 wherein the finger detection sensor is a touch capacitive sensor or a proximity sensor.

4. The handheld controller of claim 2 wherein the finger detection sensor is a touch capacitive sensor, and further comprising a proximity sensor coupled to the thumb surface.

5. The handheld controller of claim 1 wherein the finger detection sensor is a touch capacitive sensor, and further comprising a proximity sensor adjacent to the first input control.

6. The handheld controller of claim 1 wherein the second input control is a trigger on the handle, and further comprising a second finger detection sensor coupled to the trigger and configured to detect a spatial location of the second one of the user's fingers relative to the trigger.

7. The handheld controller of claim 1, further comprising a processor operative to monitor the finger detection sensor and determine the spatial location of the first one of the user's fingers relative to the finger detection sensor.

8. A handheld controller, comprising:
a body portion;
a handle extending from the body portion and configured to be grasped by a user;
a first input control on the body portion positioned for engagement by a first one of the user's fingers;
a second input control spaced apart from the first input control and positioned for engagement by a second one of the user's fingers; and
a finger detection sensor coupled to the first input control, wherein the finger detection sensor is configured to detect the spatial location of the user's finger relative to a surface of the first input control;
wherein the first input control is a thumbstick with a thumb engagement surface, and the finger detection sensor is a proximity sensor adjacent to the thumb engagement surface.

9. A handheld controller, comprising:
a body portion;
a handle extending from the body portion and configured to be grasped by a user;
a first input control on the body portion positioned for engagement by a first one of the user's fingers;
a second input control spaced apart from the first input control and positioned for engagement by a second one of the user's fingers; and
a finger detection sensor coupled to the first input control, wherein the finger detection sensor is configured to detect the spatial location of the user's finger relative to a surface of the first input control;
wherein the first input control is a thumbstick with a thumb engagement surface, and the finger detection sensor is a touch capacitive sensor on the thumb engagement surface.

10. A handheld controller, comprising:
a body portion;
a handle extending from the body portion and configured to be grasped by a user;
a first input control on the body portion positioned for engagement by a first one of the user's fingers;
a second input control spaced apart from the first input control and positioned for engagement by a second one of the user's fingers; and
a finger detection sensor coupled to the first input control, wherein the finger detection sensor is configured to detect the spatial location of the user's finger relative to a surface of the first input control;
wherein the body portion includes a thumb surface, wherein the finger detection sensor is a first finger detection sensor coupled to the thumb surface, and further comprising a second finger detection sensor coupled to the thumb surface spaced apart from the first finger detection sensor.

11. A handheld controller for use with a virtual reality system, comprising:
a body portion;
a handle extending from the body portion;
a first input control on the body portion positioned for engagement by a user's thumb;
a plurality of proximity sensors coupled to the body portion and configured to detect a spatial location and movement of the user's thumb relative to the first input control; and
a processor coupled to the plurality of proximity sensors and configured to determine the spatial location and movement of the user's thumb relative to the first input control, wherein the detected spatial location and movement are associated with a hand position or gesture in a corresponding apparition or avatar displayed in the virtual reality system.

12. The handheld controller of claim 11 wherein the body portion includes a thumb surface and further comprising a thumbstick extending from the thumb surface, wherein the a first proximity sensor is disposed on the thumbstick.

13. A handheld controller, comprising:
a body portion;
a handle extending from the body portion;
a first input control on the body portion positioned for engagement by a user's thumb;
a plurality of proximity sensors coupled to the body portion and configured to detect a spatial location of the user's thumb relative to the first input control; and
a processor coupled to the plurality of proximity sensors and configured to determine the spatial location of the user's thumb relative to the first input control;
wherein the first input control is a thumbstick with a thumb engagement surface, and further comprising a touch capacitive sensor on the thumb engagement surface.

14. A handheld controller, comprising:
a body portion;
a handle extending from the body portion;
a first input control on the body portion positioned for engagement by a user's thumb;
a plurality of proximity sensors coupled to the body portion and configured to detect a spatial location of the user's thumb relative to the first input control; and
a processor coupled to the plurality of proximity sensors and configured to determine the spatial location of the user's thumb relative to the first input control;
wherein the first input control is a thumbstick with a thumb engagement surface, and a first proximity sensors is adjacent to the thumb engagement surface.

15. A handheld controller for use with a virtual reality system, comprising:

a main body;

a handle extending from the main body;

a first input control on the main body and having a finger engagement surface positioned for engagement by a first one of a user's fingers;

a plurality of detection sensors coupled to the main body and configured to detect a spatial location and movement of the first one of a user's fingers relative to the first input control, wherein a first detection sensor is a capacitive sensor coupled to the finger engagement surface; and a processor coupled to the plurality of detection sensors and configured to determine the spatial location and movement of the first one of a user's fingers relative to the first input control, wherein the detected spatial location and movement are associated with a hand position or gesture in a corresponding apparition or avatar displayed in the virtual reality system.

16. The handheld controller of claim 15, wherein the first input control is a thumbstick with a thumb engagement surface, and the first detection sensor is a touch capacitive sensor coupled to the thumb engagement surface.

17. The handheld controller of claim 15 wherein the first input control is a thumbstick with a thumb engagement surface, and the detection sensor is a proximity sensor adjacent to the thumb engagement surface.

18. The handheld controller of claim 15 wherein the main body has a thumb surface and a thumbstick extending from the thumb surface, wherein the first detection sensor is disposed on the thumbstick.

19. The handheld controller of claim 18, further comprising a second input control on the thumb surface, and a second detection sensor is coupled to the second input control.

20. The handheld controller of claim 19, further comprising a third input control on the handle in position for engagement by a second one of the user's fingers, and further comprising a third detection sensor coupled to the third input control.

* * * * *